US006889063B2

(12) United States Patent
Yamada

(10) Patent No.: US 6,889,063 B2
(45) Date of Patent: May 3, 2005

(54) CELLULAR PHONE HAVING AN IN-ABSENCE INCOMING CALL REPORTING FUNCTION

(75) Inventor: Hironori Yamada, Saitama (JP)

(73) Assignee: NEC Corporation, Tokyo (JP)

( * ) Notice: Subject to any disclaimer, the term of this patent is extended or adjusted under 35 U.S.C. 154(b) by 506 days.

(21) Appl. No.: 10/000,444

(22) Filed: Dec. 4, 2001

(65) Prior Publication Data

US 2002/0068615 A1 Jun. 6, 2002

(30) Foreign Application Priority Data

Dec. 5, 2000 (JP) ........................................ 2000-370276

(51) Int. Cl.⁷ ................................................. H04B 1/38
(52) U.S. Cl. .................... 455/567; 455/458; 455/414.1; 455/412.1; 455/67.7; 455/568.3; 455/568.4; 455/566; 340/7.39; 379/93.23; 379/142.01
(58) Field of Search .............................. 455/458, 414.1, 455/567, 412.1, 67.7, 568.3, 568.4, 566; 340/7.39; 379/93.23, 142.01

(56) References Cited

U.S. PATENT DOCUMENTS

| 5,963,143 | A | * | 10/1999 | Tada | .......................... | 340/7.39 |
| 6,438,392 | B1 | * | 8/2002 | Toba | .......................... | 455/567 |
| 6,618,470 | B2 | * | 9/2003 | Shibuya | .................... | 379/93.24 |
| 6,728,349 | B2 | * | 4/2004 | Chang et al. | ............ | 379/93.23 |

FOREIGN PATENT DOCUMENTS

| EP | 1 111 884 A2 | 6/2001 |
| GB | 2 284 693 | 6/1995 |
| GB | 2 366 143 | 2/2002 |
| JP | 3277025 A | 9/1991 |
| JP | 8-88682 | 4/1996 |
| JP | 10-155012 | 6/1998 |
| JP | 11-308669 | 11/1999 |
| JP | 3098488 | 8/2000 |
| JP | 2001-111654 | 4/2001 |
| JP | 2001274879 | 5/2001 |
| JP | 2001-333158 | 11/2001 |

OTHER PUBLICATIONS

United Kingdom Search Report in related foriegn counterpart patent application.

Motorola "Bravo Express" Series Numeris Display Pagers; Theory Maintenance Manual dated 1991.

* cited by examiner

Primary Examiner—David Hudspeth
Assistant Examiner—David Q Nguyen
(74) Attorney, Agent, or Firm—Whitham, Curtis & Christofferson P.C.

(57) ABSTRACT

A cellular phone of the present invention is capable of displaying an in-absence incoming call message on a display if the user of the phone does not answer an incoming call. At the same time as the in-absence incoming call message is displayed, a timer starts counting a period of time set therein beforehand. A reporting device alerts the user to the incoming call when the timer counts up the preselected period of time. The phone therefore alerts the user to the incoming call not noticed or answered by the user despite that the user carries it.

15 Claims, 5 Drawing Sheets

CELLULAR PHONE HAVING AN IN-ABSENCE INCOMING CALL REPORTING FUNCTION

BACKGROUND OF THE INVENTION

1. Field of the Invention

The present invention relates to a cellular phone with an in-absence call incoming function and more particularly to a cellular phone with an in-absence call incoming function and an in-absence incoming call reporting function.

2. Description of the Background Art

A cellular phone usually has an in-absence call incoming function for displaying, when the user of the phone does not answer an incoming call, an in-absence incoming call message on its display. The user sometimes does not answer the incoming call with intention and sometimes fails to answer it. For example, it may occur that the user fails to notice an incoming call and therefore does not see an in-absence incoming call message despite that the user carries the phone.

Technologies relating to the present invention are disclosed in, e.g., Japanese Patent Laid-Open Publication No. 8-88682 and Japanese Patent No. 3,098,488

SUMMARY OF THE INVENTION

It is an object of the present invention to provide a cellular phone having an in-absence incoming call reporting function for preventing the user of the phone from failing to notice an incoming call despite that the user carries the phone.

A cellular phone of the present invention is capable of displaying an in-absence incoming call message on a display if the user of the phone does not answer an incoming call. At the same time as the in-absence incoming call message is displayed, a timer starts counting a period of time set therein beforehand. A reporting device alerts the user to the incoming call when the timer counts up the preselected period of time.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
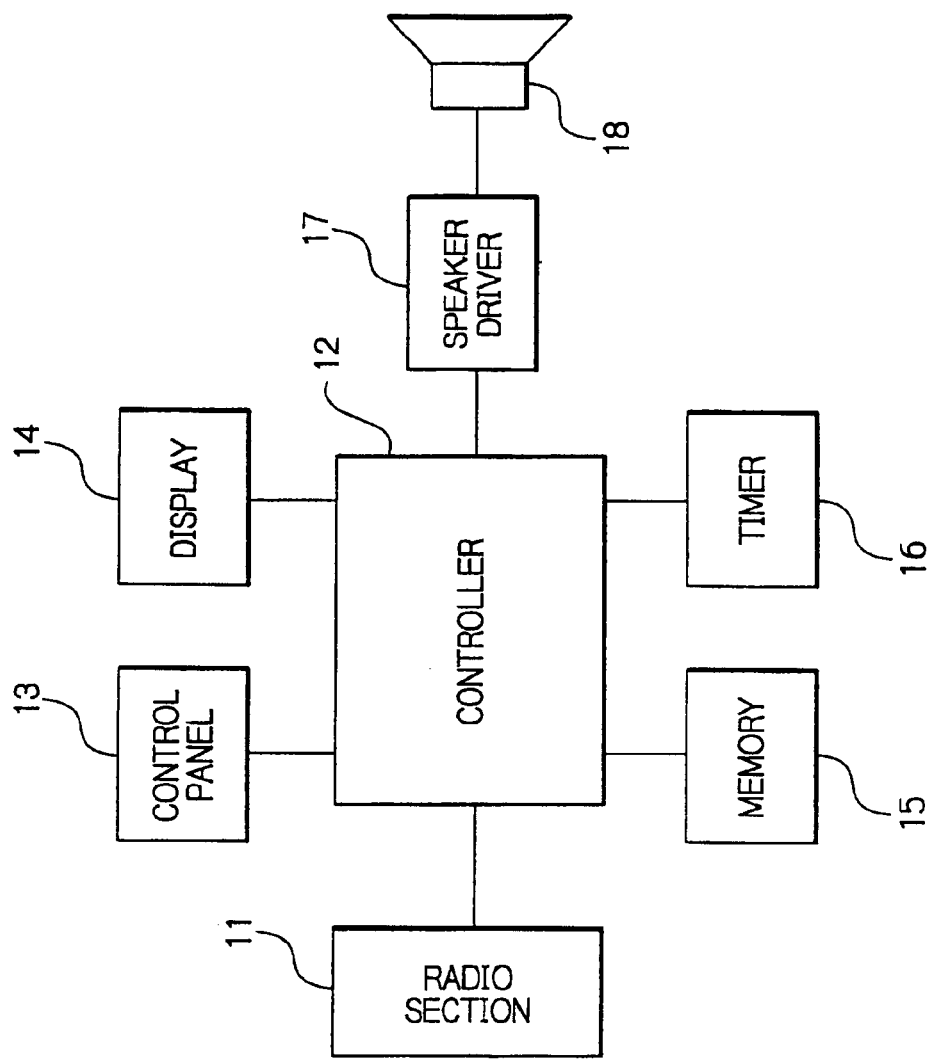
FIG. 1 is a schematic block diagram showing a cellular phone embodying the present invention.

Referring to FIG. 1 of the drawings, a cellular phone embodying the present invention is shown. As shown, the cellular phone includes a radio section 11 for receiving a radio signal from a base station not shown. A control panel 13 allows the user of the phone to, e.g., set a desired timer value or to cancel an in-absence incoming call message. A display 14 displays the in-absence incoming call message. A memory 15 stores the timer value input on the control panel 13 by the user. A timer 16 counts the timer value stored in the memory 15. A speaker driver 17 drives a speaker 18 for outputting an alert tone. A controller 12 controls such various sections of the phone.

Figure 2:
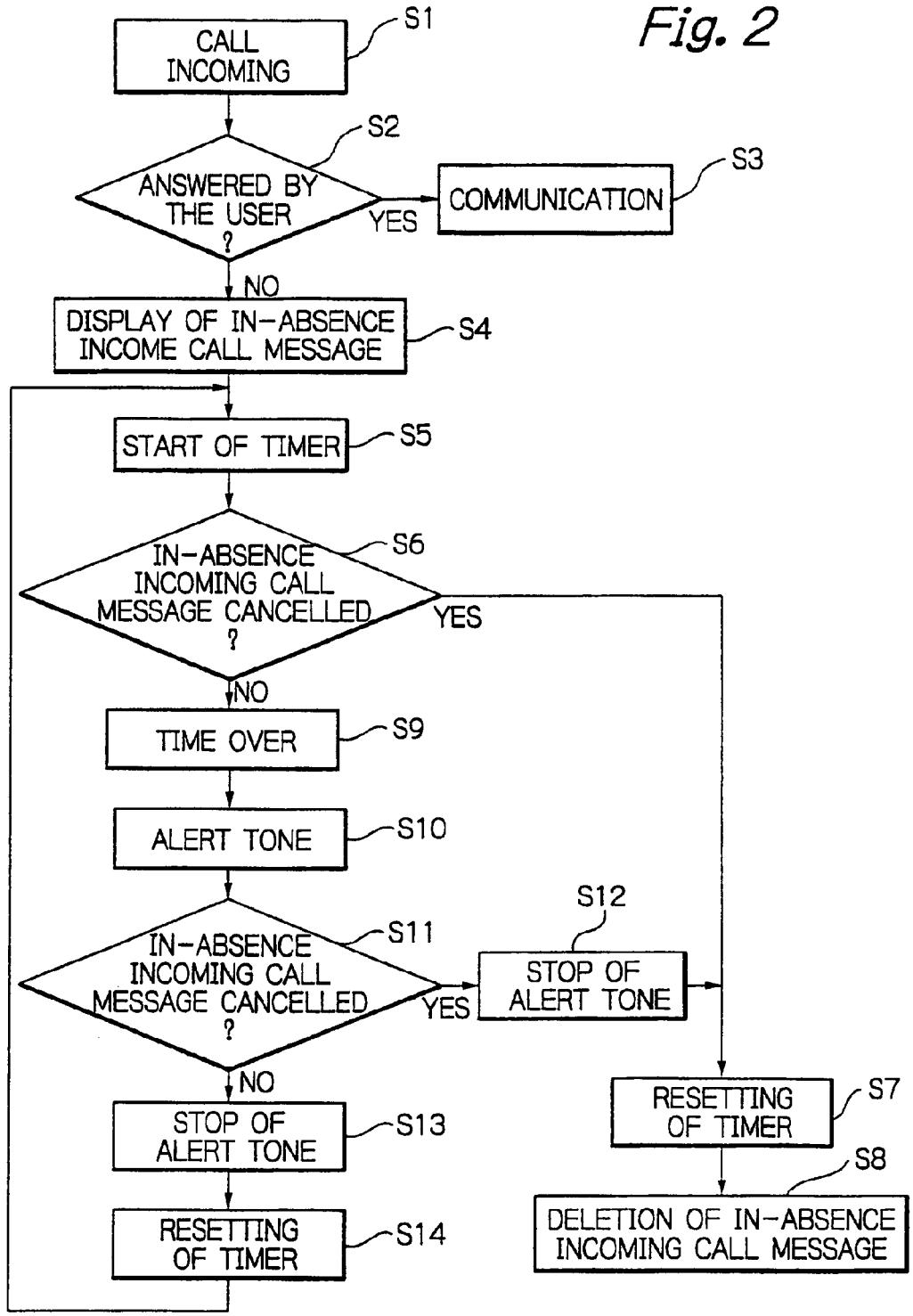
FIG. 2 is a flowchart demonstrating a specific operation of the illustrative embodiment.

Reference will be made to FIG. 2 for describing a specific operation of the illustrative embodiment. As shown, when the phone receives an incoming call (step S1), the controller 12 determines whether or not the user of the phone has answered the call (step S2). If the user has answered the call (YES, step S2), then the controller 12 sets up communication on the phone (step S3). If the incoming call ends without the user answering it (NO, step S2), then the controller 12 causes the display 14 to display an in-absence incoming call message (step S4). Subsequently, the controller 12 causes the timer 16 to starting counting a timer value stored in the memory 15 (step S5).

After the step S5, the controller 12 determines whether or not the user has canceled the in-absence incoming call message on the control panel 13 before the timer 16 counts up the timer value stored in the memory 15 (step S6). If the answer of the step S6 is positive (YES), then the controller 12 resets the timer 16 (step S7) and deletes the in-absence incoming call message (step S8). If the answer of the step S6 is negative (NO) and when the timer 16 counts up the timer value stored in the memory 15 (step S9), the controller 12 causes the speaker driver 17 to output an alert tone via the speaker 18 (step S10). The alert tone again alerts the user to the in-absence incoming call. The controller 12 again determines whether or not the user has canceled the in-absence incoming call message on the control panel 13 (step S11). If the answer of the step S11 is YES, then the controller 12 causes the speaker driver 17 to stop driving the speaker 18 (step S13), resets the timer 16 (step S14), and again starts the timer 16 for repeating the above procedure (step S5).

Figure 3:
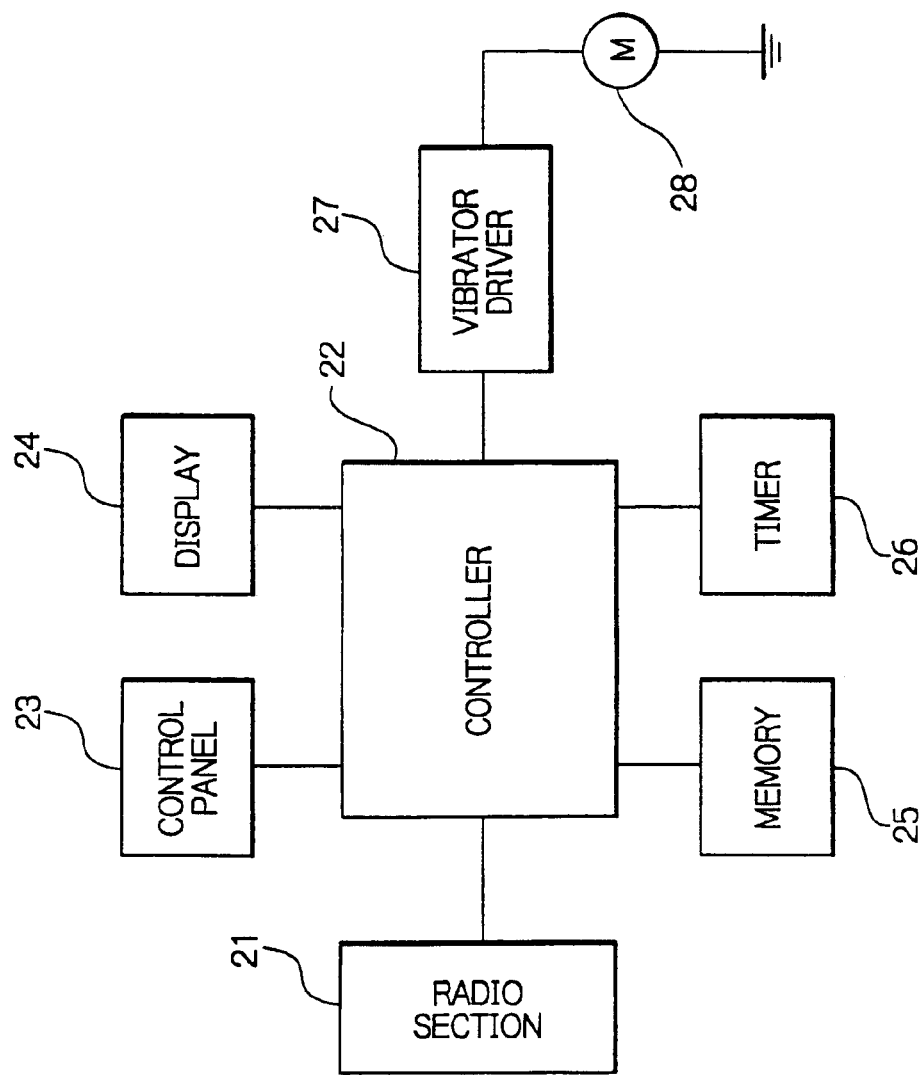
FIG. 3 is a schematic block diagram showing an alternative embodiment of the present invention.

FIG. 3 shows an alternative embodiment of the present invention. As shown, the illustrative embodiment includes a radio section 21 for receiving a radio signal from a base station not shown. A control panel 23 allows the user of the phone to, e.g., set a desired timer value or to cancel an in-absence incoming call message. A display 24 displays the in-absence incoming call message. A memory 25 stores the timer value input on the control panel 23. A timer 26 counts the timer value stored in the memory 25. A vibrator driver 27 drives a vibrator 28 for generating alert vibration. A controller 22 controls such various sections of the phone. The operation of the illustrative embodiment is identical with the operation shown in FIG. 2 except for the substitution of alert vibration for alert tone.

Figure 4:
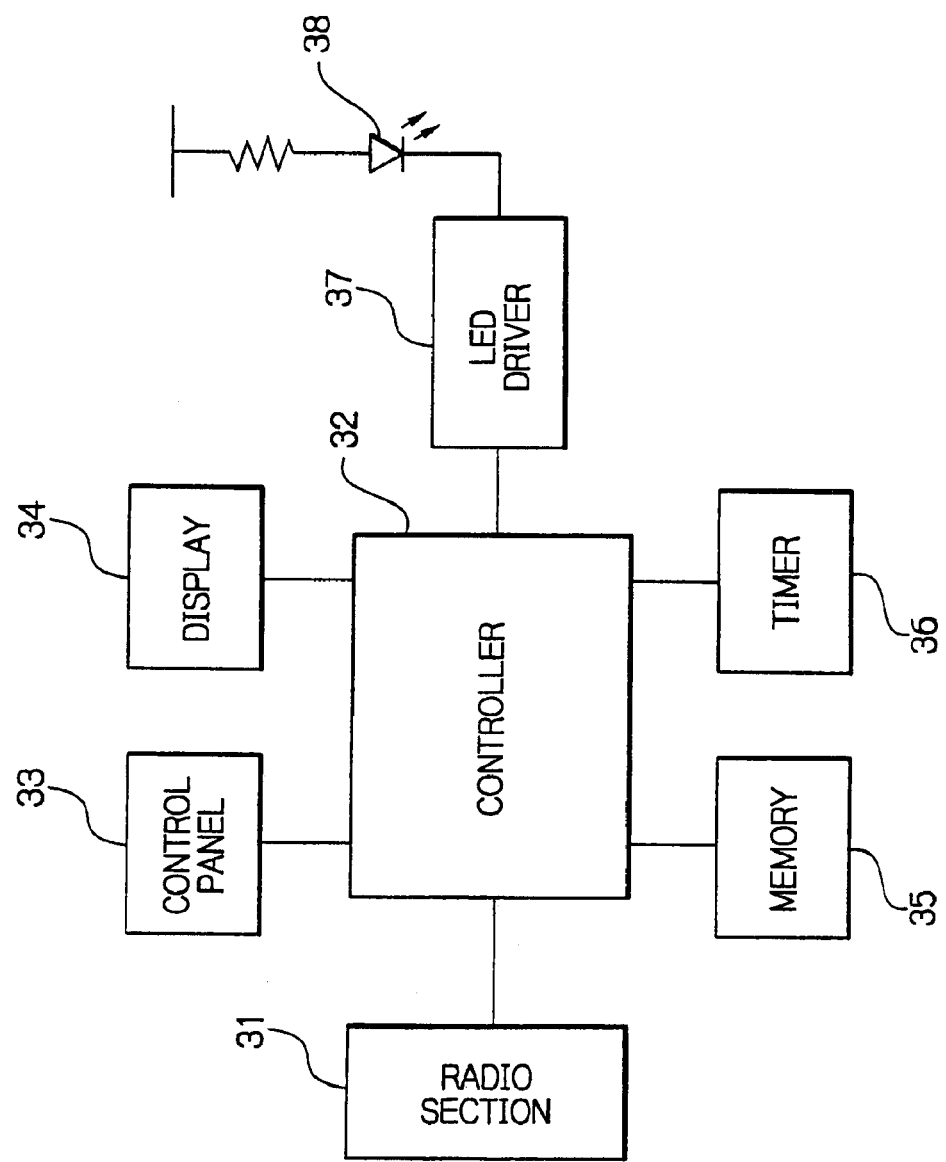
FIG. 4 is a schematic block diagram showing another alternative embodiment of the present invention.

FIG. 4 shows another alternative embodiment of the present invention. As shown, the illustrative embodiment includes a radio section 31 for receiving a radio signal from a base station not shown. A control panel 33 allows the user of the phone to, e.g., set a desired timer value or to cancel an in-absence incoming call message. A display 34 displays the in-absence incoming call message. A memory 35 stores the timer value input on the control panel 33. A timer 36 counts the timer value stored in the memory 35. An LED (Light Emitting diode) driver 37 drives an LED 38 for emitting alert light. A controller 32 controls such various sections of the phone. The operation of the illustrative embodiment is also identical with the operation shown in FIG. 2 except for the substitution of alert light for alert tone.

Figure 5:
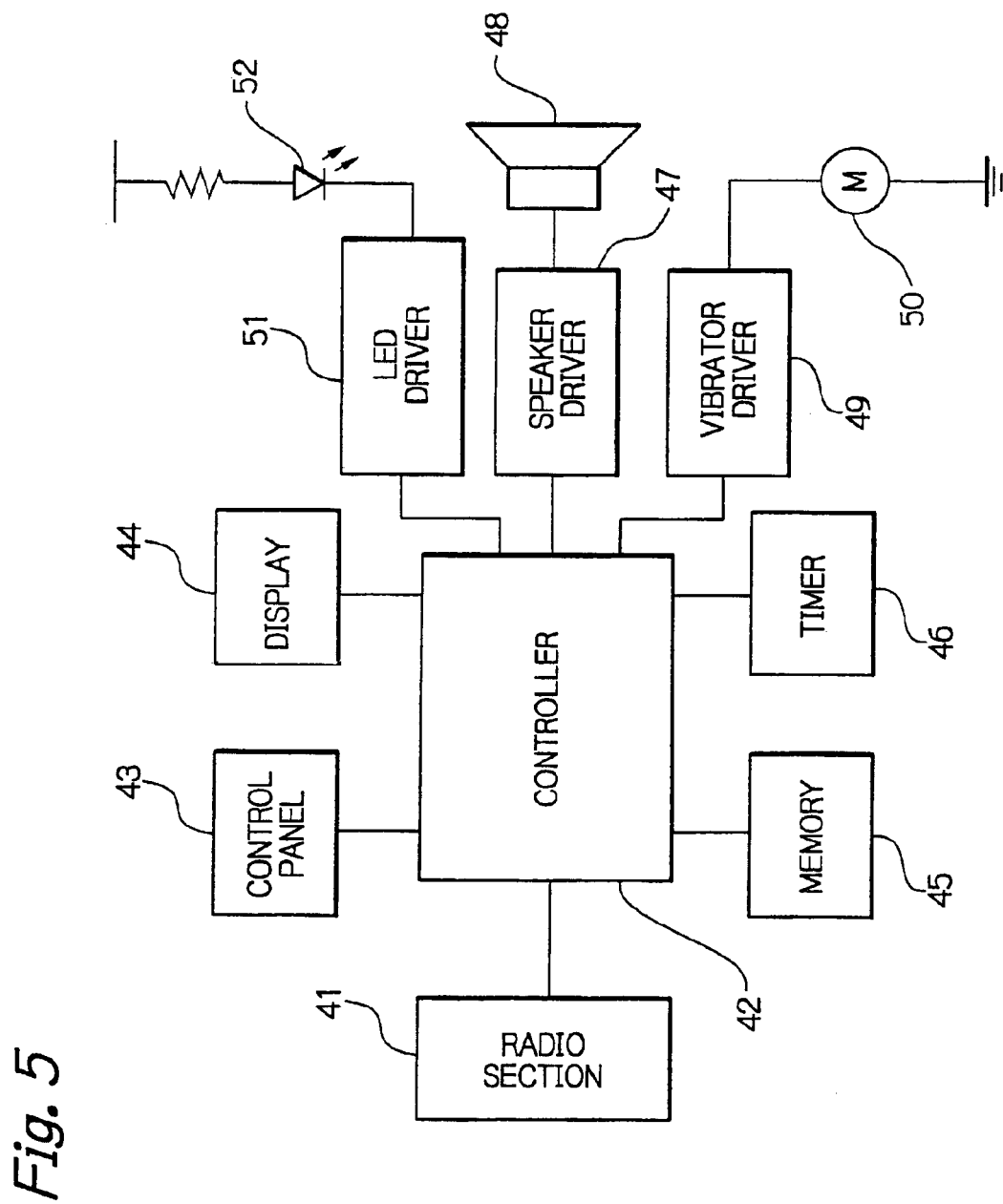
FIG. 5 is a schematic block diagram showing a further alternative embodiment of the present invention.

FIG. 5 shows a further alternative embodiment of the present invention. As shown, the illustrative embodiment includes a radio section 41 for receiving a radio signal from a base station not shown. A control panel 43 allows the user of the phone to, e.g., set a desired timer value or to cancel an in-absence incoming call message. A display 44 displays the in-absence incoming call message. A memory 45 stores the timer value input on the control panel 43. A timer 46 counts the timer value stored in the memory 45. A speaker driver 47 drives a speaker 48 for outputting alert tones. A vibrator driver 49 drives a vibrator 50 for generating alert vibration. An LED driver 51 drives an LED 52 for emitting alert light. A controller 42 controls such various sections of the phone. The operation of the illustrative embodiment is also identical with the operation shown in FIG. 2 except for the substitution of the combination of alert tone, alert vibration and alert light for alert tone.

In summary, it will be seen that the present invention provides a cellular phone capable of alerting the user of the phone to an incoming call not noticed or answered by the user despite that the user carries the phone. This advantage is derived from a unique arrangement that not only displays an in-absence incoming call message, but also produces an alert tone on the elapse of a period of time set by the user.

Various modifications will become possible for those skilled in the art after receiving the teachings of the present disclosure without departing from the scope thereof.

What is claimed is:

1. A cellular phone capable of displaying an in-absence incoming call message on a display if a user of said cellular phone does not answer an incoming call, said cellular phone comprising:

a timer for starting counting, at the same time as the in-absence incoming call message is displayed, a preselected period of time set therein beforehand; and reporting means for alerting the user to the incoming call when said timer counts up the preselected period of time.

2. The cellular phone as claimed in claim 1, further comprising canceling means for canceling the in-absence incoming call message when the user answers the incoming call before said timer counts up the preselected period of time.

3. The cellular phone as claimed in claim 1, wherein said reporting means comprises a speaker.

4. The cellular phone as claimed in claim 1, wherein said reporting means comprises a vibrator.

5. The cellular phone as claimed in claim 1, wherein said reporting means comprises a light emitting diode.

6. The cellular phone as claimed in claim 1, wherein said reporting means comprises a combination a speaker, a vibrator and a light emitting diode.

7. A cellular phone capable of displaying an in-absence incoming call message on a display if a user of said cellular phone does not answer an incoming call, said cellular phone comprising:

a timer for starting counting, at the same time as the in-absence incoming call message is displayed, a preselected period o time set therein beforehand;

reporting means for alerting the user to the incoming call when said timer counts up the preselected period of time; and repeating means for repeatedly alerting the user to the incoming call by repeatedly reporting said incoming call and repeatedly counting the preselected period of time.

8. The cellular phone as claimed in claim 7, further comprising canceling means for canceling the in-absence incoming call message when the user answers the incoming call before said timer counts up the preselected period of time.

9. The cellular phone as claimed in claim 7, further comprising canceling means for canceling repetition of a report of the incoming call when the user answers the incoming call before said timer counts up the preselected period of time.

10. The cellular phone as claimed in claim 7, wherein said reporting means comprises a speaker.

11. The cellular phone as claimed in claim 7, wherein said reporting means comprises a vibrator.

12. The cellular phone as claimed in claim 7, wherein said reporting means comprises a light emitting diode.

13. The cellular phone as claimed in claim 7, wherein said reporting means comprises a combination of a speaker, a vibrator and a light emitting diode.

14. The cellular phone as claimed in claim 1, wherein reporting means for alerting repeatedly the user to the incoming call when said timer counts up the preselected period of time until the user of said cellular phone cancels said in-absence incoming call message on said display.

15. The cellular phone as claimed in claim 7, wherein said repeating means is alerting the user to the incoming call by repeatedly reporting said incoming call and repeatedly counting the preselected period of time until the user of said cellular phone cancels said in-absence incoming call message on said display.

\* \* \* \* \*